J. D. SOWER.
SPRING WHEEL.
APPLICATION FILED AUG. 12, 1907.
927,009.
Patented July 6, 1909.
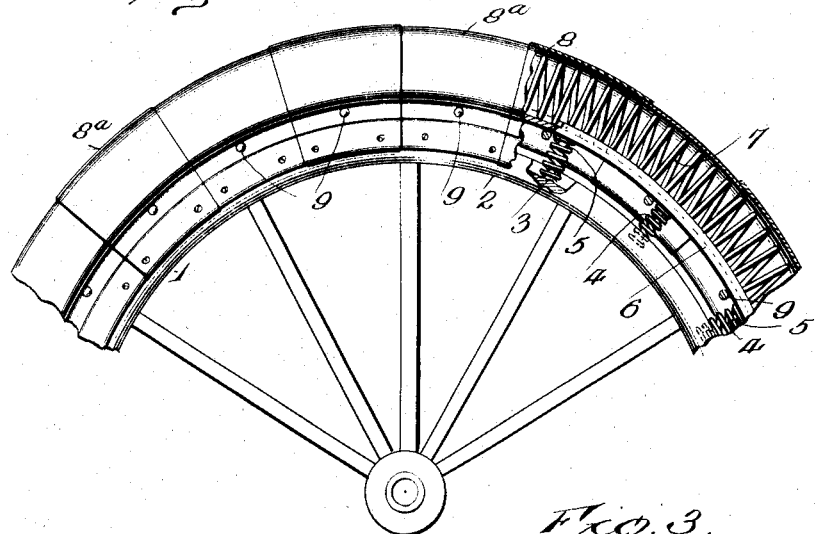
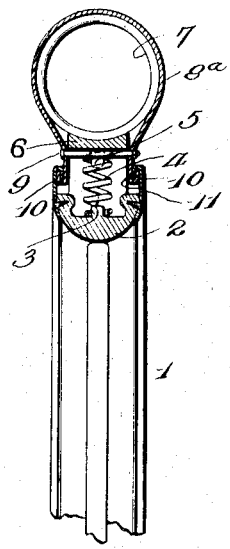
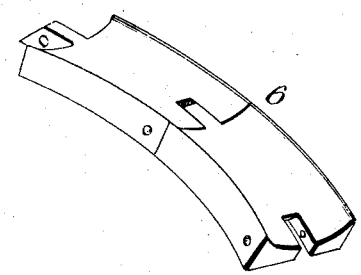
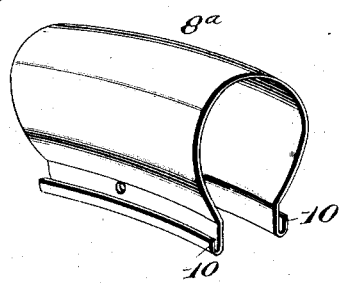
Inventor
Jacob D. Sower

UNITED STATES PATENT OFFICE.

JACOB D. SOWER, OF ELMO, KANSAS.

SPRING-WHEEL.

No. 927,009.  Specification of Letters Patent.  Patented July 6, 1909.

Application filed August 12, 1907. Serial No. 388,259.

*To all whom it may concern:*

Be it known that I, JACOB D. SOWER, citizen of the United States, residing at Elmo, in the county of Dickinson and State of Kansas, have invented certain new and useful Improvements in Spring-Wheels, of which the following is a specification.

The present invention relates to certain new and useful improvements in cushion tires of that type which are so designed as to derive their resiliency from metallic springs, thereby rendering it unnecessary to employ pneumatic sacks which are more or less objectionable owing to their liability to puncture.

The object of the invention is to provide a device of this character which is of simple and inexpensive construction and operates in an effective manner to absorb all shocks and jars and prevent the same from being transmitted to the vehicle body.

For a full description of the invention and the merits thereof and also to acquire a knowledge of the details of construction and the means for effecting the result, reference is to be had to the following description and accompanying drawings, in which:

Figure 1 is a side elevation of a portion of a wheel having the invention applied thereto, portions being broken away. Fig. 2 is a transverse sectional view through the rim of the wheel. Fig. 3 is an enlarged detail view of a portion of the rim. Fig. 4 is a detail view of one of the cover sections.

Corresponding and like parts are referred to in the following description and indicated in all the views of the drawings by the same reference characters.

Referring to the drawings the numeral 1 designates a wheel which may be of any approved construction and comprises a rim 2 having the periphery thereof grooved. Projections 3 are located at intervals upon the outer face of the rim 2 and serve to engage the inner ends of radially disposed coil springs 4 and hold the same against lateral displacement. The outer ends of these springs 4 engage corresponding projections 5 upon the inner face of a band 6 surrounding the wheel and spaced from the rim thereof. This band 6 may either be formed of a continuous strip of material as shown in Fig. 1 or may be composed of a plurality of hinged or loosely connected sections as shown in Fig. 3. The springs 4 constitute a cushioning means interposed between the rim 2 and the band 6 and serve to absorb any shocks or jars which may be transmitted to the band and prevent the said shocks or jars from reaching the body portion of the wheel.

Extending around the band 6 and bearing against the same is a continuous coil spring 7 which constitutes the tread of the wheel and is housed within a suitable covering 8. In the present instance this covering is composed of a plurality of overlapping sections 8ª which are of approximately U shape and embrace the spring 7, the edge portions of the cover sections having an interlocking connection with the rim 2. It will also be observed that the two arms of each of the cover sections are connected by a bolt 9 which extends under the band 6 and serves to hold the cover closely against the spring 7. The opposite edges of the cover sections 8ª are returned upon themselves and hooked as indicated at 10 and engage corresponding returned flanges 11 projecting radially from opposite sides of the rim 2. In the present instance these flanges 11 are formed by rings which are secured to opposite sides of the rim.

With this construction it will be readily apparent that any of the shocks and jars which should not be taken up by the tread portion of the wheel constituted by the continuous spring will be absorbed by the radial springs 4 before reaching the body of the wheel and being transmitted to the vehicle.

Having thus described the invention, what is claimed as new is:

1. The combination of a wheel comprising a rim, a band surrounding the wheel, cushioning means interposed between the band and the wheel, a coil spring extending continuously around the band, and a cover for the spring, the edges of the cover having an interlocking connection with the rim of the wheel and the sides of the cover being connected by a pin extending under the band.

2. The combination of a wheel comprising a rim, returned flanges projecting from the rim, a band surrounding the wheel, radial springs interposed between the band and the wheel, a coil spring extending continuously around the band, and a cover for the spiral spring, the said cover comprising overlapping sections each of which is of approximately U shape, the edges of the cover sections being hooked and having an interlocking connection with the before mentioned returned flanges and the opposite sides of the cover sections being connected by a pin extending under the before mentioned band.

In testimony whereof I affix my signature in presence of two witnesses.

JACOB D. SOWER. [L. S.]

Witnesses:
A. S. PERCY,
EDW. J. LORSON.